(12) United States Patent
Zhou et al.

(10) Patent No.: US 11,675,082 B2
(45) Date of Patent: Jun. 13, 2023

(54) METHOD AND DEVICE FOR OPTICAL DISTANCE MEASUREMENT

(71) Applicant: SHENZHEN CAMSENSE TECHNOLOGIES CO., LTD, Guangdong (CN)

(72) Inventors: Kun Zhou, Guangdong (CN); Le Li, Guangdong (CN); Lei Yuan, Guangdong (CN); Guangxi Zeng, Guangdong (CN)

(73) Assignee: SHENZHEN CAMSENSE TECHNOLOGIES CO., LTD, Shenzhen (CN)

( * ) Notice: Subject to any disclaimer, the term of this patent is extended or adjusted under 35 U.S.C. 154(b) by 468 days.

(21) Appl. No.: 16/827,662

(22) Filed: Mar. 23, 2020

(65) Prior Publication Data

US 2020/0225355 A1   Jul. 16, 2020

Related U.S. Application Data

(63) Continuation of application No. PCT/CN2018/091300, filed on Jun. 14, 2018.

(30) Foreign Application Priority Data

Oct. 19, 2017   (CN) .......................... 201710976980.2

(51) Int. Cl.
  *G01S 17/48*   (2006.01)
  *G01S 7/481*   (2006.01)
  *G01S 17/89*   (2020.01)

(52) U.S. Cl.
  CPC ............ *G01S 17/48* (2013.01); *G01S 7/4814* (2013.01); *G01S 7/4816* (2013.01); *G01S 17/89* (2013.01)

(58) Field of Classification Search
  CPC ...... G01S 17/48; G01S 7/4814; G01S 7/4816; G01S 7/89; G01S 7/493; G01S 7/497
  See application file for complete search history.

(56) References Cited

U.S. PATENT DOCUMENTS 9,779,561 B1 * 10/2017 Dorrance ............. G07C 5/0808
2002/0060795 A1 * 5/2002 Metcalfe ................ G01B 11/04
356/625

(Continued)

FOREIGN PATENT DOCUMENTS

CN   104166142 A   11/2014
CN   105928456 A   9/2016

(Continued)

*Primary Examiner* — David P Porta
*Assistant Examiner* — Mamadou Faye (57) ABSTRACT

A device for optical distance measurement includes a light emitter configured to emit light to a target object; a light receiver configured to receive reflected light obtained after the light is emitted to the target object, wherein the light receiver comprises a lens and an array image sensor containing a photosensitive area which is divided into one or more photosensitive sub-areas configured to collect one or more light spots of the reflected light; and the light receiver is further configured to generate a response signal comprising position information of the one or more light spots of the reflected light; and a processor configured to receive the response signal generated by the light receiver and calculate, according to the position information of the light spots of the reflected light, a distance from the target object to the device for optical distance measurement by triangulation method.

19 Claims, 5 Drawing Sheets

(56) References Cited

U.S. PATENT DOCUMENTS

| | | | |
|---|---|---|---|
| 2006/0187441 A1 | 8/2006 | Sugiyama et al. | |
| 2010/0030380 A1 | 2/2010 | Shah et al. | |
| 2016/0020855 A1* | 1/2016 | Guetta | H04B 10/116 |
| | | | 398/130 |
| 2019/0056498 A1* | 2/2019 | Sonn | G01S 17/931 |
| 2019/0096057 A1* | 3/2019 | Allen | H04N 7/181 |
| 2020/0011995 A1* | 1/2020 | Send | G01S 17/42 |

FOREIGN PATENT DOCUMENTS

| | | |
|---|---|---|
| CN | 206321237 U | 7/2017 |
| CN | 206470403 U | 9/2017 |
| CN | 108072879 A | 5/2018 |
| CN | 207457505 U | 6/2018 |

\* cited by examiner

METHOD AND DEVICE FOR OPTICAL DISTANCE MEASUREMENT

CROSS-REFERENCE TO RELATED APPLICATIONS

This disclosure is a continuation of International Patent Application No. PCT/CN2018/091300, filed on Jun. 14, 2018, which is based upon and claims priority to Chinese Patent Application No. 201710976980.2, entitled "METHOD AND DEVICE FOR OPTICAL DISTANCE MEASUREMENT" and filed in China Patent Office on Oct. 19, 2017, the entire contents of which are incorporated herein by reference.

TECHNICAL FIELD

The present disclosure relates to the field of spatial positioning, and specifically, relates to a method and a device for optical distance measurement.

BACKGROUND

With the miniaturization of components and the cost reduction, spatial positioning and distance measurement technology has become more and more popular in general consumer-grade markets, among which the most typical application scenario is the autonomous navigation field of mobile terminals such as household small-scale robots and unmanned aerial vehicles. Among the spatial distance measurement technologies, compared with other methods for distance measurement such as ultrasonic distance measurement and radio-frequency circuit distance measurement, optical distance measurement has advantages of high precision, a fast response, and relatively strong anti-interference and therefore is widely adopted. A most common device for optical positioning and measuring basically comprises an optical emitting device and an optical receiving device. Methods for distance measurement comprise a pulse time difference method, a phase difference method, and a triangulation measurement method. Among these methods, the phase difference method has high precision and a long measurement distance, but a low measurement frequency and a slow response, thus is not suitable for high-speed mobile measurement. The pulse time difference method has a high measurement frequency and a fast response, but has a high requirement on hardware. The triangulation measurement method is a relatively eclectic method, and has a moderate measurement distance and precision, a fast response, and relatively low hardware costs. Therefore, in most consumer-grade optical distance measurement devices such as laser radars used in sweeping robots, the triangulation measurement method is widely used.

At present, most of the consumer-grade optical distance measurement devices (such as sweeping robots) have a relatively high requirement for collection response speed. Therefore, to ensure a high frame rate (for example, greater than 1800 frames/second) during measurement, in the prior art, an optical device of triangulation measurement generally uses a linear image sensor of a special structure, which costs 6 to 10 times of costs of an ordinary array image sensor, and is difficult to be popularized due to its high price. Moreover, compared with the array image sensor, each pixel of the linear image sensor may be a square or a rectangular (for example, 32 um*4 um), and a distribution of pixel quantities in rows and columns of the linear image sensor has an obvious linear characteristic (for example, a pixel quantity in each row is: 2048, and a row quantity is: 4). It is precisely because the quantity of rows of sensitive pixels in the linear image sensor is very few, a photosensitive area of the sensor is narrow. Therefore, a light emitter needs to be strictly aligned with a central horizontal position of pixels of the linear sensor, to ensure that reflected light can be received by the sensor. Therefore, a relatively high standard for mounting errors of a laser pitch angle is required, which is disadvantageous for production. In addition, existing devices for optical distance measurement can only measure a single light spot, thus a sampling density is not sufficiently high.

SUMMARY

An embodiment of the present disclosure provides a device for optical distance measurement, comprising:
a light emitter, configured to emit light to a target object;
a light receiver, configured to receive reflected light obtained after the light is emitted to the target object, wherein the light receiver comprises a lens and an array image sensor, the array image sensor comprises a photosensitive area, the photosensitive area is divided into one or more photosensitive sub-areas, and the one or more photosensitive sub-areas are configured to collect one or more light spots of the reflected light; and the light receiver is further configured to generate a response signal, wherein the response signal comprising: position information of the one or more light spots of the reflected light; and
a processor, configured to receive the response signal generated by the light receiver, and calculate, according to the position information of the light spots of the reflected light, a distance from the target object to the device for optical distance measurement by triangulation method.

Another embodiment of the present disclosure further provides an array image sensor, comprising: a photosensitive area, the photosensitive area is divided into one or more photosensitive sub-areas, and the one or more photosensitive sub-areas are configured to collect one or more light spots of reflected light, and obtain position information of the one or more light spots of the reflected light; and the array image sensor is further configured to generate a response signal, and send the response signal to a device for optical distance measurement, wherein the response signal comprises the position information of the one or more light spots of the reflected light.

Another embodiment of the present disclosure provides a method for optical distance measurement, comprising:
emitting, by a light emitter, light to a target object;
receiving, by an array image sensor, reflected light obtained after the light is emitted to the target object, and generating a response signal, wherein the response signal comprises position information of one or more light spots of the reflected light, wherein the array image sensor comprises a photosensitive area, and the array image sensor divides the photosensitive area into one or more photosensitive sub-areas, so that the array image sensor collects the one or more light spots of the emitted light by using the one or more photosensitive sub-areas; and
calculating, by a processor, a distance to the target object according to the position information of the one or more light spots of the reflected light.

BRIEF DESCRIPTION OF DRAWINGS

For a clearer description of the technical solutions according to the embodiments of the present disclosure, brief description is given with reference to the accompanying drawings for illustrating the embodiments hereinafter. Apparently, the accompanying drawings described hereinafter only illustrate some embodiments of the present disclosure, and other accompanying drawings may also be derived based on these accompanying drawings.

DETAILED DESCRIPTION

To make the objectives, technical solutions and advantages of the present disclosure clearer, the following further describes the present disclosure in detail with reference to the accompanying drawings and the embodiments. It should be understood that specific embodiments described herein are merely used to explain the present disclosure, and are not intended to limit the present disclosure. In addition, technical features involved in implementations of the present disclosure described below can be combined with each other as long as they do not form a conflict with each other.

Embodiment 1

Figure 1A:
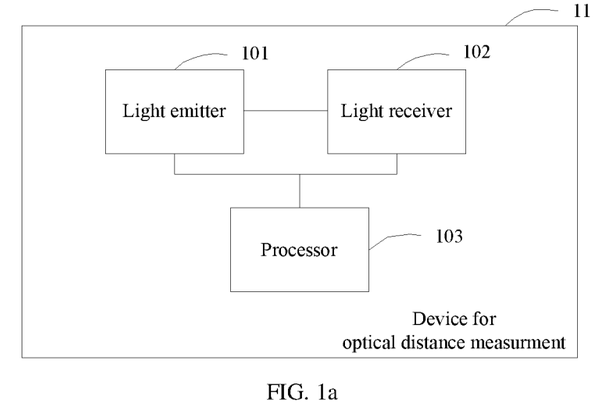
FIG. 1a is a structural composition diagram of a device for optical distance measurement according to Embodiment 1 of the present disclosure.

To achieve the foregoing objectives, as shown in FIG. 1a, the present disclosure provides a device 11 for optical distance measurement. The device 11 comprises the following components:

A light emitter 101, configured to emit light to a target object.

Figure 1B:
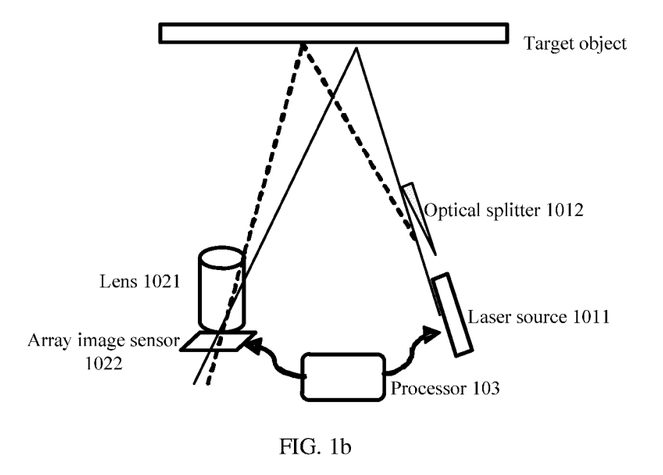
FIG. 1b is another structural composition diagram of the device for optical distance measurement according to Embodiment 1 of the present disclosure.

Optionally, as shown in FIG. 1b, the light emitter 101 emits spot-shaped light (such as laser) to the target object. The light emitter 101 comprises a laser source 1011 and an optical splitter 1012. The laser source 1011 is configured to generate laser and emit the laser. The optical splitter 1012 is positioned at an emitting port of the laser source 1011, and is configured to split spot-shaped laser emitted by the laser source 1011 into one or more beams of spot-shaped laser, emit the one or more beams of spot-shaped laser to the target object, and generate corresponding one or more beams of spot-shaped reflected laser. Dividing one laser spot into multiple laser spots can ensure that the device for optical distance measurement collects multiple light spots of reflected light at the same time, thereby increasing collection density.

Optionally, the optical splitter 1012 is a diffraction grating (a Diffraction Optical Element, DOE) or an optical prism, or may be other optical splitters, for which there is not limited in this embodiment of the present disclosure.

Figure 2A:
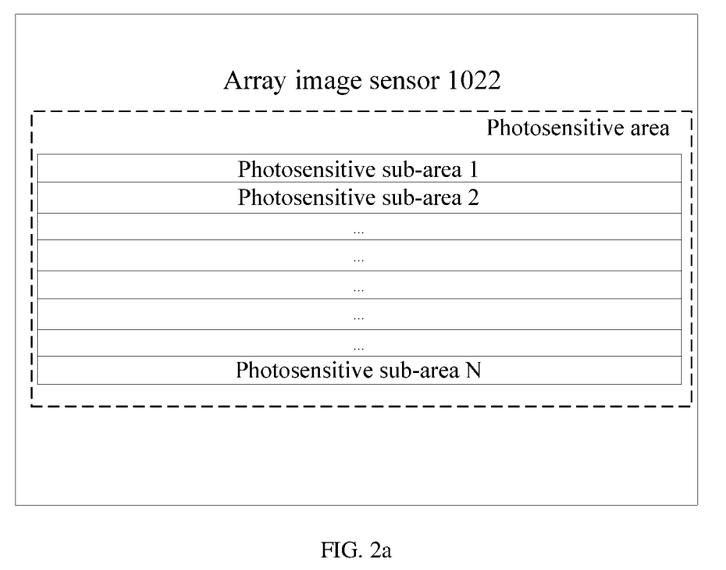
FIG. 2a is a schematic division diagram of a photosensitive area according to Embodiment 1 of the present disclosure.

A light receiver 102, configured to receive reflected light obtained after the light is emitted by the light emitter 101 to the target object. The light receiver 102 comprises a lens 1021 and an array image sensor 1022. The array image sensor 1022 comprises a photosensitive area. As shown in FIG. 2a, the photosensitive area is divided into one or more photosensitive sub-areas (a photosensitive sub-area 1, a photosensitive sub-area 2, . . . , and a photosensitive sub-area N). The one or more photosensitive sub-areas are configured to collect one or more light spots of the reflected light. The light receiver is further configured to generate a response signal, and the response signal comprises position information of the one or more light spots of the reflected light.

Comparing the array image sensor with a linear image sensor, each pixel of the array image sensor is a square, with a width and a height being the same size (for example, 3 um*3 um), and a ratio of a pixel quantity in each row to a row quantity may be 4:3 or 16:9 (for example, a pixel quantity in each row is: 1280, and a row quantity is: 720); while each pixel of the linear image sensor may be a square or a rectangular (for example, 32 um*4 um), and distribution of pixel quantities in rows and columns presents an obvious linear characteristic (for example, a pixel quantity in each row is: 2048, and a row quantity is: 4). However, all of devices for optical distance measurement used in service robots (for example, sweeping robots) currently used on the consumer-grade market use expensive linear image sensors and do not use inexpensive array image sensors without exception. Because the array image sensor itself has a large area of imaging, and both a design function and a manufacturing process of the array image sensor do not have several major characteristics of linear sensors, such as a small window, less data, a high frame rate, and high sensitivity within a low exposure time. Therefore, the array image sensors are not initially developed or used for performing linear scanning. That is, the array image sensors are not used as linear sensors. In conclusion, many characteristics of the array image sensor determine that the array image sensor is not designed for high-speed linear scanning. If most of imaging areas of the array image sensor are discarded, but only a small strip of the imaging areas is used, and a frame rate is output at a high speed, two problems arise: Firstly, resources of the array image sensor are greatly wasted. Secondly, in order to output a frame rate at a high speed, a number of parameter adjustments must be made to the underlying settings of the array image sensor, to ensure that the array image sensor can achieve a high speed (greater than 1800 frames/second) and highly sensitive output within an extremely short exposure time (dozens of microseconds), which most of array image sensors on the market cannot achieve currently. Therefore, for a person of ordinary skill in the art, all of consumer-grade high-speed and highly sensitive optical distance measurement devices generally use linear image sensors instead of array image sensors. However, in this embodiment of the present disclosure, a technical means is creatively provided in which an inexpensive array image sensor instead of a linear image sensor is used and one or more photosensitive sub-areas in an array image sensor are used to collect one or more light spots of reflected light, so that a data processing speed is high, sampling precision and density are greatly increased, and high-speed distance measurement effects that can be achieved only by using a linear image sensor previously can also be achieved. The following effects are achieved:

I. Product costs are greatly reduced, product competitive advantages are increased, and a commercial success is brought. Because costs of a linear image sensor are several times of costs of an array image sensor, a solution of using the array image sensor instead of the linear image sensor can greatly reduce costs of devices for optical distance measurement, which is advantageous for popularity of products on the consumer-grade market, bringing a commercial success.

II. A technical prejudice is eliminated. In conclusion, all of high-speed devices for optical distance measurement currently existing on the consumer-grade market use linear image sensors instead of array image sensors. Obviously, because an array image sensor has features of large area collection and a large amount of data processing, a person of ordinary skill in the art believes that use of the array image sensor in the field of high-speed optical distance measurement is not feasible at all. However, in the solution provided in this embodiment of the present disclosure, an array image sensor is creatively used instead of a linear sensor, and the same technical effect is achieved, thereby exactly eliminating the technical prejudice that the array image sensor cannot be applied to the field of high-speed optical distance measurement.

Figure 2B:
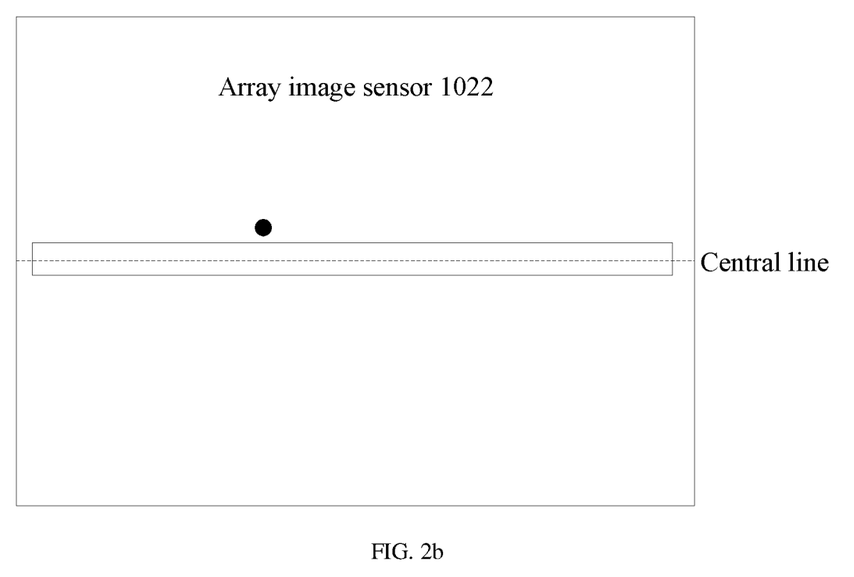
FIG. 2b is a schematic diagram of misalignment between a center of a light emitter and a central line of the photosensitive area according to Embodiment 1 of the present disclosure.

Optionally, as shown in FIG. 2a, the photosensitive area may be divided into one or more strip-shaped photosensitive sub-areas, wherein row quantities of all or some of the photosensitive sub-areas may be set to M, M being a positive integer greater than or equal to 1. A start row, an end row, a start column, and an end column of each photosensitive sub-area may be pre-configured, and both a height and a position of each photosensitive sub-area can be dynamically adjusted, as long as a corresponding position of a start row, row height, and column height are modified in a register of the array image sensor. For example, after the light emitter emits light to the target object, and the array image sensor enables an exposure function, the array image sensor first globally scans every pixel on a photosensitive surface. After detecting an area in which light spots of reflected light are located, the array image sensor may dynamically set a photosensitive area (wherein the photosensitive area is an area comprising all the light spots of the reflected light, a size of the photosensitive area can be dynamically set, and an area thereof is less than or equal to an area of the photosensitive surface) on the photosensitive surface, set a position of a corresponding start row, row height, and column height, and divide the photosensitive area into multiple photosensitive sub-areas. Afterwards, position information of the light spots of the reflected light can be quickly obtained by scanning pixels in the photosensitive area row by row. The benefit of this is: if a barycenter of light spots of reflected light does not fall into the photosensitive sub-area (as shown in FIG. 2b) due to a mounting error during manufacturing of the device for optical distance measurement, a position of the start row of the photosensitive sub-area can be dynamically adjusted, so that the light spots of the reflected light still fall within the photosensitive sub-area, thereby reducing requirements for production process.

Figure 2C:
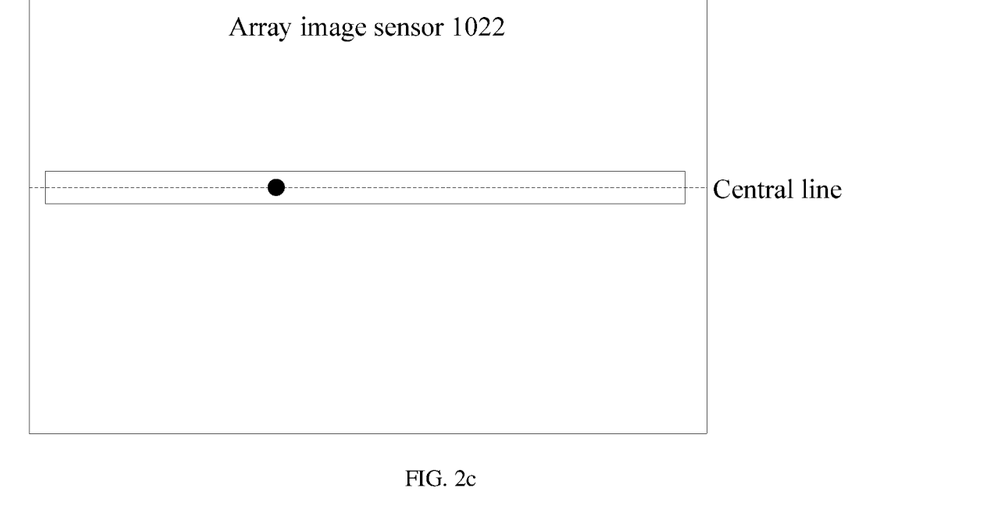
FIG. 2c is a schematic diagram of a special case in which the number of light spot of reflected light is one and the number of photosensitive sub-area is one according to Embodiment 1 of the present disclosure.

For ease of understanding for a person of ordinary skill in the art, each strip-shaped photosensitive sub-area may be construed as a photosensitive area of a linear image sensor, and multiple strip-shaped photosensitive sub-areas may be construed as vertical "superposition" of surface arrays of photosensitive areas of multiple linear image sensors. When the quantity of the photosensitive sub-area is one and the quantity of the collected light spot of the reflected light is one, an imaging effect is shown in FIG. 2c. In this case, for ease of understanding, this case can be construed as a special case in which an array image sensor is used to "simulate" a linear image sensor. However, a person of ordinary skill in the art should understand that, the description herein is merely used to help a person of skill more easily understand the technical solutions provided by this embodiment of the present disclosure. In an actual product, to divide an array image sensor into one or more strip-shaped photosensitive sub-areas, complex configuration, verification, and subsequent data processing are required, and it is not simply "simulating" or "superposing" photosensitive areas of linear image sensors.

Figure 2D:
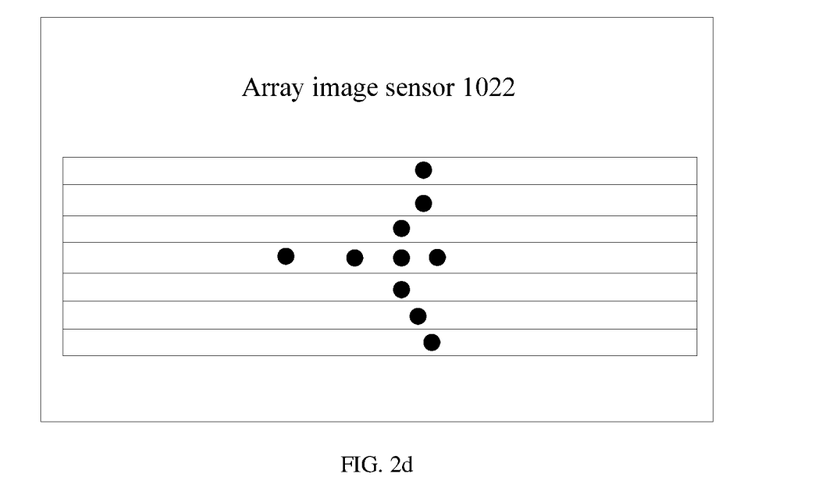
FIG. 2d is a schematic diagram showing that light spots of the reflected light are distributed in a cross-like shape according to Embodiment 1 of the present disclosure.
Figure 2E:
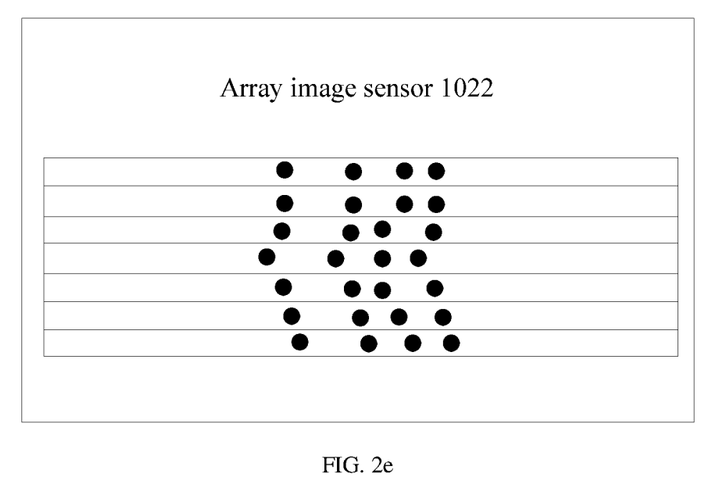
FIG. 2e is a schematic diagram showing that the light spots of the reflected light are distributed in a matrix-like shape according to Embodiment 1 of the present disclosure.

Optionally, when the light emitter 101 emits multiple beams of spot-shaped light through the optical splitter 1012, multiple photosensitive sub-areas are configured to collect multiple light spots of reflected light, and the multiple light spots of the reflected light are distributed in a cross-like shape or a matrix-like shape in the multiple photosensitive sub-areas. It should be noted that, a distribution in the cross-like shape indicates that imaging of the light spots of the reflected light is equal to or approximate to a distribution of a cross shape. For the imaging of the light spots of the reflected light, a position of each light spot may be deviated, so that the light spots present a distribution in a non-absolute cross shape, and may present imaging approximate to a distribution of a cross shape. Similarly, a distribution in a matrix-like shape indicates that imaging is equal to or approximate to a distribution of a matrix shape. FIG. 2d is a schematic diagram showing that light spots of reflected light are distributed in a cross-like shape in photosensitive sub-areas. As shown in FIG. 2d, in the photosensitive area, there are P rows of the light spots of the reflected light (as shown in the schematic diagram, P=7), wherein there are Q spots (as shown in the schematic diagram, Q=4) in a row in the center, and there is one spot in each of the remaining rows, P and Q both being positive integers. FIG. 2e is a schematic diagram showing that light spots of reflected light are distributed in a matrix-like shape in photosensitive sub-areas. As shown in FIG. 2e, a difference between a distribution in a matrix shape and a distribution in a cross shape lies in that there are P rows in the distribution in the matrix shape, and there are Q spots in each row.

Optionally, position information of the light spots of the reflected light comprises row position information and column position information. The array image sensor 1022 is further configured to: obtain column position information of the one or more light spots of the reflected light after the one or more light spots of the reflected light are collected by the one or more photosensitive sub-areas. Optionally, the obtaining column position information of the one or more light spots of the reflected light specifically comprises: obtaining, by the array image sensor, column coordinate information of a barycenter position of the one or more light spots of the reflected light. It should be noted that the barycenter position is a position obtained after brightness weighted averaging is performed on valid coordinates in an area, and the barycenter position is different from a central position, which is a geometric center of a smallest bounding box of the area. For example, if the light spots of the reflected light occupy five pixels in one photosensitive sub-area, the barycenter position of the light spots of the reflected light is a position obtained after brightness weighted averaging is performed on coordinates of the five pixels. The reason why the column coordinate information of the barycenter position needs to be obtained is that, according to the triangulation measurement method, when a relative angle and a distance between the light emitter 101 and the array image sensor 1022 are known, a distance from the target object to the device for optical distance measurement can be measured according to the column coordinate information. In addition, according to the triangulation measurement method, measurement can be performed as long as the column coordinate information is known, without needing to obtain row coordinate information of the barycenter position. Therefore, the photosensitive sub-areas may be arranged mainly in a column direction, and only one row or a very few quantity of rows may be used in a row direction.

Figure 3:
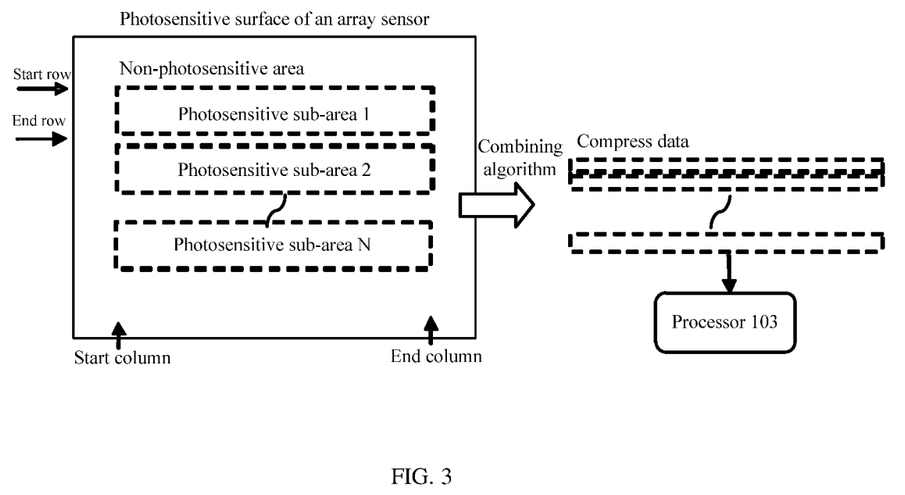
FIG. 3 is a schematic diagram of a single column pixel combining algorithm according to Embodiment 1 of the present disclosure.

Optionally, the array image sensor 1022 is further configured to perform a single column pixel combining algorithm (a binning algorithm), and the binning algorithm is able to implement quick data reading of the array image sensor, by compressing pixel information of the M rows divided on the sensor into pixel information of one or more rows. The binning algorithm specifically comprises: calculating an average value of grayscale values of several pixels in each column of the photosensitive sub-area, wherein a calculated result is a result in which pixel information of the M rows is compressed into pixel information of one row or several rows. In this case, when a vertical field of view does not change, a data volume is a fraction of an original data volume, and a signal-to-noise ratio of an output image is greatly increased. As shown in FIG. 3, after a data volume of the M rows is collected, a data volume compressed by using the binning algorithm is only a fraction of the original data volume.

Optionally, the array image sensor 1022 may comprise multiple photosensitive sub-areas. One or more of the multiple photosensitive sub-areas are set, by the array image sensor, as valid photosensitive areas, while the remaining photosensitive sub-areas are set as invalid photosensitive areas. Wherein the array image sensor 1022 generates and outputs a response signal, after light spots of the reflected light are collected by the valid photosensitive areas; while, wherein the array image sensor 1022 skips outputting a response signal, after the light spots of the reflected light are collected by the invalid photosensitive areas; thereby achieving an objective of reducing a data processing amount of each frame of image and obtaining a high frame rate.

A processor 103, is configured to receive the response signal generated by the light receiver 102, and calculate, according to the position information of the light spots of the reflected light, a distance from the target object to the device 11 for optical distance measurement by using a triangulation method.

Optionally, the processor 103 may comprise a main control module and a data processing module. The main control module is configured to enable/disable the light emitter 101 to emit light to the target object, and is also responsible for enabling/disabling the light receiver to receive reflected light. In this embodiment of the present disclosure, the main control module simultaneously or sequentially enables the photosensitive sub-areas to perform exposure, so that the array image sensor 1022 can obtain one or more light spots of the reflected light at a time. The data processing module is configured to receive the response signal generated by the light receiver 102, and measure a distance by using a triangulation method.

The triangulation method is a commonly used measuring method in the field of optical distance measurement. The method is as follows: a barycenter position of an area is calculated, and a relative angle and a distance between a laser emitting device and an image sensor are known, so that a distance from a target to the image sensor can be deduced. A basic measurement formula in the triangulation method is z=b*f/x, wherein, b represents a distance between a laser emitting device and an image sensor, f is a focal length of a lens used by the image sensor, x is an obtained barycenter position of column coordinates of reflected light that is projected onto the image sensor, and z is a measured distance. It can be learned from the formula that, the measured distance is only related to a position of a barycenter in a column direction, and is not related to a row quantity. Therefore, a photosensitive surface array may be arranged mainly in the column direction, and only one row or a very few quantity of rows is used in the row direction. In addition, a measurement error formula is e=1/(b*f/(n*z)+1), wherein n represents an error in barycenter extraction. It can be learned that, the measure error e is inversely proportional to b and f, and is directly proportional to n and z. Therefore, when b, f, and n are determined, a lens that has a relatively long focal length needs to be selected to reduce errors for different distances.

For distance measurement of a distribution in a cross-like shape and a distribution in a matrix-like shape in FIG. 2d and FIG. 2e, the triangulation method is also applicable to each light spot of reflected light. In addition, for each light spot of reflected light, a connected domain segmentation method is generally used to obtain an area in which the spot is located, thus multiple spots appearing on the same row can also be solved. The connected domain segmentation method is one of algorithms commonly used by a person skilled in the art, and details are not described herein in this embodiment of the present disclosure.

In this embodiment of the present disclosure, the array image sensor used in this solution has low costs. A laser beam is divided into multiple laser beams by an optical splitter, and imaging is performed in multiple photosensitive sub-areas in the sensor, so that distance data of a measured object can be obtained in a high-speed, high-density and multi-area manner. In addition, exposed pixels have more rows, thereby increasing calculation precision and reducing redundancy. Meanwhile, an image is compressed by using a single column pixel combining algorithm, thereby increasing a signal-to-noise ratio, and reducing calculation complexity. In addition, as a position of a sub-area in this solution can be dynamically adjusted, and a particular range of mounting errors for a laser can be permitted, when an angle of the laser is changed due to a problem such as collision, only a start height of the sub-area needs to be dynamically adjusted, a measurement module does not need to be detached, and a mounting process does not need to be adjusted.

Embodiment 2

Figure 4:
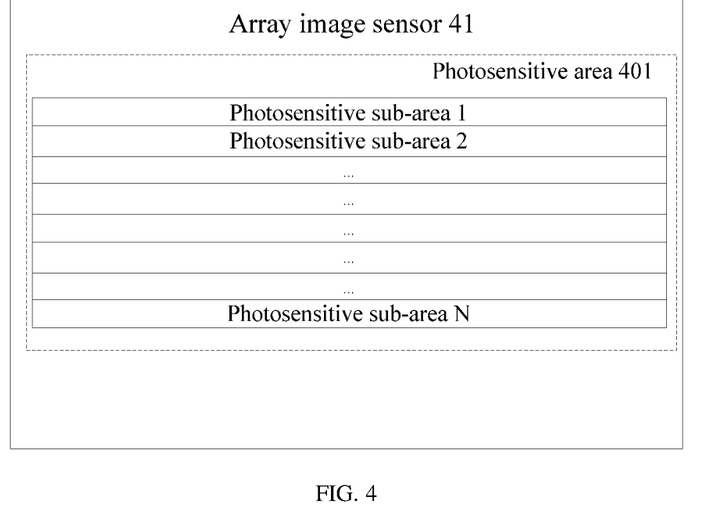
FIG. 4 is schematic structural diagram of an array image sensor according to Embodiment 2 of the present disclosure.

This embodiment of the present disclosure provides an array image sensor 41. As shown in FIG. 4, the array image sensor 41 comprises a photosensitive area 401. The photosensitive area is divided into one or more photosensitive sub-areas. The one or more photosensitive sub-areas are configured to collect one or more light spots of reflected light, and obtain position information of the one or more light spots of the reflected light. The array image sensor 41 is further configured to generate a response signal, and send the response signal to a device for optical distance measurement, so that the device for optical distance measurement measures a distance from a target object to the device for optical distance measurement according to the response signal by using a triangulation method. Wherein, the response signal comprises the position information of the one or more light spots of the reflected light.

In this embodiment of the present disclosure, the array image sensor may be a complementary metal-oxide-semiconductor CMOS image sensor or a charge-coupled device CCD image sensor.

Comparing the array image sensor with a linear image sensor, for the former one, each pixel is a square, with a width and a height being the same size (for example, 3 um*3 um), and a ratio of a pixel quantity in each row to a row quantity may be 4:3 or 16:9 (for example, a pixel quantity in each row is: 1280, and a row quantity is: 720); while for the latter one, each pixel may be a square or a rectangular (for example, 32 um*4 um), and distribution of pixel quantities in rows and columns presents an obvious linear characteristic (for example, a pixel quantity in each row is: 2048, and a row quantity is: 4). However, all of devices for optical distance measurement used in service robots (for example, sweeping robots) currently used on the consumer-grade market use expensive linear image sensors and do not use inexpensive array image sensors without exception. Because the array image sensor itself has a large area of imaging, and both a design function and a manufacturing process of the array image sensor do not have several major characteristics of linear sensors, such as a small window, less data, a high frame rate, and high sensitivity within a low exposure time. Therefore, the array image sensors are not initially developed or used for performing linear scanning. That is, the array image sensors are not used as linear sensors. In conclusion, many characteristics of the array image sensor determine that the array image sensor is not designed for high-speed linear scanning. If most of imaging areas of the array image sensor are discarded, but only a small strip thereof is used, and a frame rate is output at a high speed, two problems arise. Firstly, resources of the array image sensor are greatly wasted. Secondly, in order to output a frame rate at a high speed, a number of parameter adjustments must be made to the underlying settings of the array image sensor, to ensure that the array image sensor can achieve a high speed (greater than 1800 frames/second) and highly sensitive output within an extremely short exposure time (dozens of microseconds), which most of the array image sensors on the market cannot achieve currently. Therefore, for a person of ordinary skill in the art, all of consumer-grade high-speed and highly sensitive optical distance measurement devices generally use linear image sensors instead of array image sensors. However, in this embodiment of the present disclosure, a technical means is creatively provided in which an inexpensive array image sensor instead of a linear image sensor is used and one or more photosensitive sub-areas in the array image sensor are used to collect one or more light spots of reflected light, so that a data processing speed is high, sampling precision and density are greatly increased, and high-speed distance measurement effects that can be achieved only by using a linear image sensor previously can also be achieved. The following effects are achieved:

I. Product costs are greatly reduced, product competitive advantages are increased, and a commercial success is brought. Because costs of a linear image sensor are several times of costs of an array image sensor, a solution of using the array image sensor instead of the linear image sensor can greatly reduce costs of devices for optical distance measurement, which is advantageous for popularity of products on the consumer-grade market, bringing a commercial success.

II. A technical prejudice is eliminated. In conclusion, all of high-speed devices for optical distance measurement currently existing on the consumer-grade market use linear image sensors instead of array image sensors. Obviously, because an array image sensor has features of large area collection and a large amount of data processing, a person of ordinary skill in the art believes that use of the array image sensor in the field of high-speed optical distance measurement is not feasible at all. However, in the solution provided in this embodiment of the present disclosure, an array image sensor is creatively used instead of a linear sensor, and the same technical effect is achieved, thereby exactly eliminating the technical prejudice that the array image sensor cannot be applied to the field of high-speed optical distance measurement.

Optionally, the photosensitive area 401 is divided into one or more photosensitive sub-areas. Specifically, the photosensitive area is divided into one or more strip-shaped photosensitive sub-areas, wherein the photosensitive sub-area has M rows, M being a positive integer greater than or equal to 1. A start row, an end row, a start column, and an end column of each photosensitive sub-area may be preconfigured, and both a height and a position of each photosensitive sub-area can be dynamically adjusted, as long as a corresponding start row, row height, and column height are modified in a register of the array image sensor. For example, after a light emitter emits light to a target object, and the array image sensor enables an exposure function, the array image sensor first globally scans every pixel on a photosensitive surface. After detecting an area in which light spots of reflected light are located, the array image sensor may dynamically set a photosensitive area (wherein the photosensitive area is an area comprising all the light spots of the reflected light, a size of the photosensitive area can be dynamically set, and an area thereof is less than or equal to an area of the photosensitive surface) on the photosensitive surface, set a position of a corresponding start row, row height, and column height, and divide the photosensitive area into multiple photosensitive sub-areas. Afterwards, position information of the light spots of the reflected light can be quickly obtained by scanning pixels in the photosensitive area row by row. The benefit of this is: if a barycenter of light spots of reflected light does not fall into the photosensitive sub-area (as shown in FIG. 2b) due to a mounting error during manufacturing of the device for optical distance measurement, a position of the start row of the photosensitive sub-area can be dynamically adjusted, so that the light spots of the reflected light still fall within the photosensitive sub-area, thereby reducing requirements for production process.

For ease of understanding for a person of ordinary skill in the art, each strip-shaped photosensitive sub-area may be construed as a photosensitive area of a linear image sensor, and multiple strip-shaped photosensitive sub-areas may be construed as vertical "superposition" of surface arrays of photosensitive areas of multiple linear image sensors. When the quantity of the photosensitive sub-area is one and the quantity of the collected light spot of the reflected light is one, an imaging effect is shown in FIG. 2c. In this case, for ease of understanding, this case can be construed as a special case in which an array image sensor is used to "simulate" a linear image sensor. However, a person of ordinary skill in the art should understand that, the description herein is merely used to help a person of skill more easily understand the technical solutions provided by this embodiment of the present disclosure. In an actual product, to divide an array image sensor into one or more strip-shaped photosensitive sub-areas, complex configuration, verification, and subsequent data processing are required, and it is not simply "simulating" or "superposing" photosensitive areas of linear image sensors.

Optionally, the obtaining position information of the one or more light spots of the reflected light specifically comprises: obtaining column position information of the one or more light spots of the reflected light after the one or more light spots of the reflected light is collected by the one or more photosensitive sub-areas. Optionally, the obtaining column position information of the one or more light spots of the reflected light specifically comprises: obtaining, by the array image sensor, column coordinate information of a barycenter position of the one or more light spots of the reflected light. It should be noted that the barycenter position is a position obtained after brightness weighted averaging is performed on valid coordinates in an area, and the barycenter position is different from a central position which is a geometric center of a smallest bounding box of the area. For example, if the light spots of the reflected light occupy five pixels in one photosensitive sub-area, the barycenter position of the light spots of the reflected light is a position obtained after brightness weighted averaging is performed on coordinates of the five pixels. The reason why the column coordinate information of the barycenter position needs to be obtained is that, according to the triangulation measurement method, when a relative angle and a distance between the light emitter and the array image sensor 41 are known, a distance from the target object to the device for optical distance measurement can be measured according to the column coordinate information.

Optionally, that the one or more photosensitive sub-areas are configured to collect the one or more light spots of the reflected light specifically comprises: when multiple beams of spot-shaped light are received by the array image sensor, multiple photosensitive sub-areas are configured to collect multiple light spots of the reflected light, and the multiple light spots of the reflected light are distributed in a cross-like shape or a matrix-like shape in the multiple photosensitive sub-areas.

Optionally, the array image sensor is further configured to perform a single column pixel combining algorithm, that is, calculating an average value of grayscale values of several pixels in each column of the photosensitive sub-area, wherein a calculated result is a result in which pixel information of the M rows is compressed into pixel information of one row or several rows. In this case, when a vertical field of view does not change, a data volume is a fraction of an original data volume, and a signal-to-noise ratio of an output image is greatly increased. As shown in FIG. 3, after a data volume of the M rows is collected, a data volume compressed by using the single column pixel combining algorithm is only a fraction of the original data volume.

Optionally, the array image sensor 41 comprises multiple photosensitive sub-areas. One or more of the multiple photosensitive sub-areas are set, by the array image sensor, as valid photosensitive areas which generate and output a response signal, after collecting the light spots of the reflected light; while the remaining photosensitive sub-areas are set as invalid photosensitive areas which skip outputting a response signal, after collecting the light spots of the reflected light; thereby achieving an objective of reducing a data processing amount of each frame of image and obtaining a high frame rate.

In this embodiment of the present disclosure, an inexpensive array image sensor is used and can be dynamically divided into multiple photosensitive sub-areas to collect multiple light spots at a time, thereby resolving prior-art problems of excessively high costs, high mounting requirement, and low sampling density caused by use of linear image sensors to implement optical distance measurement, effectively reducing costs, increasing a sampling density, and improving error tolerance for mounting errors.

Embodiment 3

Figure 5:
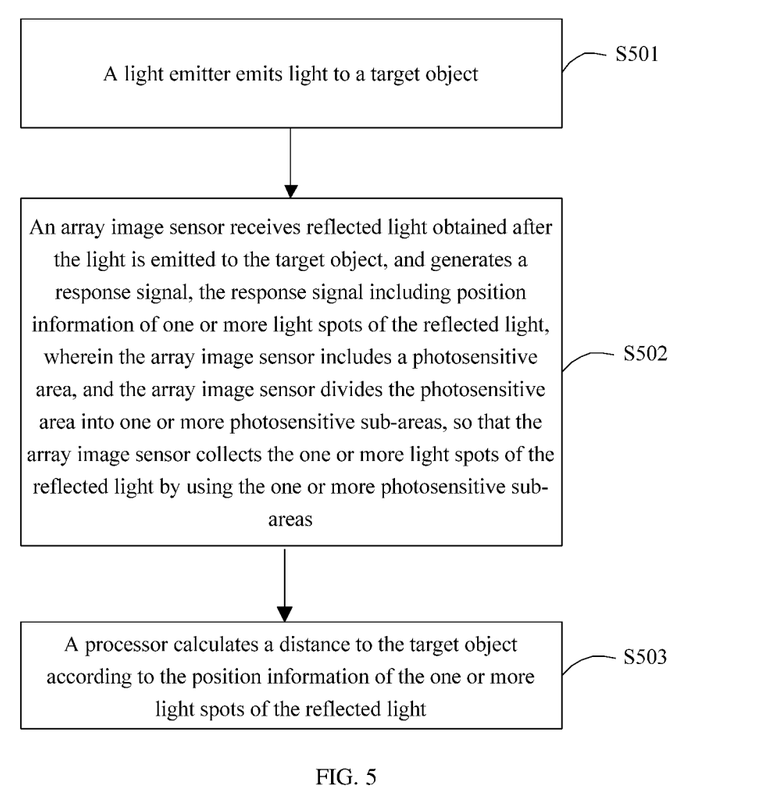
FIG. 5 is a flowchart of a method for optical distance measurement according to Embodiment 3 of the present disclosure.

This embodiment of the present disclosure provides a method for optical distance measurement. As shown in FIG. 5, the method comprises the following steps:

In S501, a light emitter emits light to a target object.

Optionally, a device for optical distance measurement may comprise an optical splitter configured to split a beam of emitted light into one or more beams of emitted light and emits the one or more beams of emitted light to a target object, and generate corresponding one or more beams of spot-shaped reflected laser. Dividing one laser spot into multiple laser spots can ensure that the device for optical distance measurement collects multiple light spots of reflected light at the same time, thereby increasing collection density.

In S502, a device for optical distance measurement receives, by using an array image sensor, reflected light obtained after the light is emitted to the target object, and generates a response signal, the response signal comprising position information of one or more light spots of the reflected light. Wherein, the array image sensor comprises a photosensitive area, and the array image sensor divides the photosensitive area into one or more photosensitive sub-areas (a photosensitive sub-area 1, a photosensitive sub-area 2, . . . , a photosensitive sub-area N), so that the array image sensor collects the one or more light spots of the reflected light by using the one or more photosensitive sub-areas.

Comparing the array image sensor with a linear image sensor, for the former one, each pixel is a square, with a width and a height being the same size (for example, 3 um*3 um), and a ratio of a pixel quantity in each row to a row quantity may be 4:3 or 16:9 (for example, a pixel quantity in each row is: 1280, and a row quantity is: 720); while for the latter one, each pixel may a square or a rectangular (for example, 32 um*4 um), and distribution of pixel quantities in rows and columns presents an obvious linear characteristic (for example, a pixel quantity in each row is: 2048, and a row quantity is: 4). However, all of devices for optical distance measurement used in service robots (for example, sweeping robots) currently used on the consumer-grade market use expensive linear image sensors and do not use inexpensive array image sensors without exception. Because the array image sensor itself has a large area of imaging, and both a design function and a manufacturing process of the array image sensor do not have several major characteristics of linear sensors, such as a small window, less data, a high frame rate, and high sensitivity within a low exposure time. Therefore, the array image sensors are not initially developed or used for performing linear scanning. That is, the array image sensors are not used as linear sensors. In conclusion, many characteristics of the array image sensor determine that the array image sensor is not designed for high-speed linear scanning. If most of imaging areas of the array image sensor are discarded, but only a small strip thereof is used, and a frame rate is output at a high speed, two problems arise. Firstly, resources of the array image sensor are greatly wasted. Secondly, in order to output a frame rate at a high speed, a number of parameter adjustments must be made to the underlying settings of the array image sensor, to ensure that the array image sensor can achieve a high speed (greater than 1800 frames/second) and highly sensitive output within an extremely short exposure time (dozens of microseconds), which most of the array image sensors on the market cannot achieve currently. Therefore, for a person of ordinary skill in the art, all of consumer-grade high-speed and highly sensitive optical distance measurement devices generally use linear image sensors instead of array image sensors. However, in this embodiment of the present disclosure, a technical means is creatively provided in which an inexpensive array image sensor instead of a linear image sensor is used and one or more photosensitive sub-areas in the array image sensor are used to collect one or more light spots of reflected light, so that a data processing speed is high, sampling precision and density are greatly increased, and high-speed distance measurement effects that can be achieved only by using a linear image sensor previously can also be achieved. The following effects are achieved:

I. Product costs are greatly reduced, and product competitive advantages are increased. Because costs of a linear image sensor are several times of costs of an array image sensor, a solution of using the array image sensor instead of the linear image sensor can greatly reduce costs of devices for optical distance measurement, which is advantageous for popularity of products on the consumer-grade market, bringing a commercial success.

II. A technical prejudice is eliminated. In conclusion, all of high-speed devices for optical distance measurement currently existing on the consumer-grade market use linear image sensors instead of array image sensors. Obviously, because an array image sensor has features of large area collecting and a large amount of data processing, a person of ordinary skill in the art believes that use of the array image sensor in the field of high-speed optical distance measurement is not feasible at all. However, in the solution provided in this embodiment of the present disclosure, an array image sensor is creatively used instead of a linear sensor, and the same technical effect is achieved, thereby exactly eliminating the technical prejudice that the array image sensor cannot be applied to the field of high-speed optical distance measurement.

Wherein, the array image sensor may further obtain column position information of the one or more light spots of the reflected light after collecting the one or more light spots of the reflected light. Optionally, the obtaining column position information of the one or more light spots of the reflected light specifically comprises: obtaining, by the array image sensor, column coordinate information of a barycenter position of the one or more light spots of the reflected light. It should be noted that the barycenter position is a position obtained after brightness weighted averaging is performed on valid coordinates in an area, and the barycenter position is different from a central position which is a geometric center of a smallest bounding box of the area. For example, if the light spots of the reflected light occupy five pixels in one photosensitive sub-area, the barycenter position of the light spots of the reflected light is a position obtained after brightness weighted averaging is performed on coordinates of the five pixels. The reason why the column coordinate information of the barycenter position needs to be obtained is that, according to the triangulation measurement method, when a relative angle and a distance between the light emitter and the array image sensor are known, a distance from the target object to the device for optical distance measurement can be measured according to the column coordinate information. In addition, according to the triangulation measurement method, measurement can be performed as long as the column coordinate information is known, without needing to obtain row coordinate information of the barycenter position. Therefore, the photosensitive sub-areas may be arranged mainly in a column direction, and only one row or a very few quantity of rows may be used in a row direction.

Wherein, the collecting the one or more light spots of the reflected light specifically comprises: when light emitter emits multiple beams of spot-shaped light, multiple photosensitive sub-areas collect multiple light spots of the reflected light, and the multiple light spots of the reflected light are distributed in a cross-like shape or a matrix-like shape in the multiple photosensitive sub-areas.

Wherein, the method further comprises: calculating, by the device for optical distance measurement, an average value of grayscale values of several pixels in each column of the photosensitive sub-area, wherein a calculated result is a result in which pixel information of the M rows is compressed into pixel information of one row or several rows. In this case, when a vertical field of view does not change, a data volume is a fraction of an original data volume, and a signal-to-noise ratio of an output image is greatly increased. As shown in FIG. 3, after a data volume of the M rows is collected, a data volume compressed by using the single column pixel combining algorithm is only a fraction of the original data volume.

In S503, a processor calculates a distance from the target object to the array image sensor according to the position information of the one or more light spots of the reflected light.

The triangulation method is a commonly used measuring method in the field of optical distance measurement. The method is as follows: a barycenter position of an area is calculated, and a relative angle and a distance between a laser emitting device and an image sensor are known, so that a distance from a target to the image sensor can be deduced. A basic measurement formula in the triangulation method is $z=b*f/x$, wherein b represents a distance between a laser emitting device and an image sensor, f is a focal length of a lens used by the image sensor, x is an obtained barycenter position of column coordinates of reflected light that is projected onto the image sensor, and z is a measured distance. It can be learned from the formula that, the measured distance is only related to a position of a barycenter in a column direction, and is not related to a row quantity. Therefore, a photosensitive surface array may be arranged mainly in the column direction, and only one row quantity or a very few quantity of rows is used in a row direction. In addition, a measurement error formula is $e=1/(b*f/(n*z)+1)$, wherein n represents an error in barycenter extraction. It can be learned that, the measure error e is inversely proportional to b and f, and is directly proportional to n and z. Therefore, when b, f, and n are determined, a lens that has a relatively long focal length needs to be selected to reduce errors for different distances.

According to the method provided in this embodiment of the present disclosure, an inexpensive array image sensor is used and can be dynamically divided into multiple photosensitive sub-areas to collect multiple light spots of reflected light at a time, thereby resolving prior-art problems of excessively high costs, high mounting requirement, and low sampling density caused by use of linear image sensors to implement optical distance measurement, effectively reducing costs, increasing a sampling density, and improving error tolerance for mounting errors.

It should be understood that sequence numbers of the processes do not mean execution sequences in various embodiments of this application. The execution sequences of the processes should be determined according to functions and internal logic of the processes, and should not be construed as any limitation on the implementation processes of the embodiments of this disclosure.

A person of ordinary skill in the art may aware that, the modules and method steps in the examples described with reference to the embodiments disclosed in this specification may be implemented by electronic hardware or a combination of computer software and electronic hardware. Whether these functions are performed by using hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for convenient and brief description, for a specific working process of the foregoing described systems, devices, and modules, reference may be made to a corresponding process in the foregoing method embodiment, and details are not described herein.

Various parts of this specification are all described in a progressive manner, and for the same or similar parts between the embodiments, reference may be made to these embodiments, and each embodiment focuses on a difference from other embodiments. Particularly, device and system embodiments are basically similar to the method embodiments, and therefore are described briefly, and for related parts, reference may be made to the descriptions in the method embodiments.

Finally, it should be noted that the foregoing descriptions are merely preferred embodiments of the technical solutions of this disclosure, and are not intended to limit the protection scope of this disclosure. Obviously, a person skilled in the art can make various modifications and variants to the disclosure without departing from the scope of this disclosure. If the modifications and variants of this disclosure fall within a scope of the claims of this disclosure and an equivalent technology, any modifications, equivalent replacements, improvements, and the like that are made should be comprised in the protection scope of this disclosure.

What is claimed is:

1. A device for optical distance measurement, wherein, the device for optical distance measurement comprises:
a light emitter, configured to emit light to a target object;
a light receiver, configured to receive reflected light obtained after the light is emitted to the target object, wherein the light receiver comprises a lens and an array image sensor, the array image sensor comprises a photosensitive area, the photosensitive area is divided into multiple photosensitive sub-areas, and the multiple photosensitive sub-areas are configured to collect multiple light spots of the reflected light; and the light receiver is further configured to generate a response signal, wherein the response signal comprises position information of the multiple light spots of the reflected light; and
a processor, configured to receive the response signal generated by the light receiver, and calculate, according to the position information of the light spots of the reflected light, a distance from the target object to the device for optical distance measurement by triangulation method;
wherein, the array image sensor is further configured to:
dynamically adjust a position of each photosensitive sub-area by modifying a corresponding position in a register of the array image sensor, so that a barycenter of the multiple light spots of the reflected light falls into the multiple photosensitive sub-areas.

2. The device according to claim 1, wherein, one or more of the multiple photosensitive sub-areas being set, by the array image sensor, as valid photosensitive areas, while the remaining photosensitive sub-areas being set as invalid photosensitive areas; wherein, the array image sensor generates and outputs a response signal, after the light spots of the reflected light are collected by the valid photosensitive areas, while the array image sensor skips outputting a response signal, after the light spots of the reflected light are collected by the invalid photosensitive areas.

3. The device according to claim 1, wherein, the light emitter comprises a laser source and an optical splitter, wherein the optical splitter is configured to split spot-shaped laser emitted by the laser source into multiple beams of spot-shaped laser.

4. The device according to claim 3, wherein, the optical splitter is a diffraction optical element or an optical prism.

5. An array image sensor, wherein the array image sensor comprises a photosensitive area, wherein the photosensitive area is divided into multiple photosensitive sub-areas, and the multiple photosensitive sub-areas are configured to collect multiple light spots of reflected light, and obtain position information of the multiple light spots of the reflected light; and the array image sensor is further configured to generate a response signal, and send the response signal to a processor, wherein, the response signal comprises the position information of the multiple light spots of the reflected light;
wherein, the array image sensor is further configured to:
dynamically adjust a position of each photosensitive sub-area by modifying a corresponding position in a register of the array image sensor, so that a barycenter of the multiple light spots of the reflected light falls into the multiple photosensitive sub-areas.

6. The array image sensor according to claim 5, wherein, the array image sensor is a complementary metal-oxide-semiconductor CMOS image sensor or a charge-coupled device CCD image sensor.

7. A method for optical distance measurement, wherein, the method for optical distance measurement comprises:
emitting, by a light emitter, light to a target object;
receiving, by an array image sensor, reflected light obtained after the light is emitted to the target object, and generating a response signal, wherein, the response signal comprises position information of multiple light spots of the reflected light, the array image sensor comprises a photosensitive area, and the array image sensor divides the photosensitive area into multiple photosensitive sub-areas, so that the array image sensor collects the multiple light spots of the reflected light by using the multiple photosensitive sub-areas, wherein, the method further comprises:

dynamically adjusting a position of each photosensitive sub-area by modifying a corresponding position in a register of the array image sensor, so that a barycenter of the multiple light spots of the reflected light falls into the multiple photosensitive sub-areas.

8. The method according to claim 7, wherein, after the collecting the multiple light spots of the reflected light, the method further comprises:

obtaining column position information of the multiple light spots of the reflected light.

9. The method according to claim 7, wherein, the collecting the multiple light spots of the reflected light comprises:

when the light emitter for optical distance measurement emits multiple beams of spot-shaped light, collecting, by the multiple photosensitive sub-areas, the multiple light spots of the reflected light, wherein the multiple light spots of the reflected light are distributed in a cross-like shape or a matrix-like shape in the multiple photosensitive sub-areas.

10. The method according to claim 7, wherein, the photosensitive area is divided into multiple photosensitive sub-areas comprises:

the photosensitive area is divided into multiple strip-shaped photosensitive sub-areas, wherein the photosensitive sub-areas have M rows; and calculating, by a processor, a distance from the target object to the array image sensor according to the position information of the multiple light spots of the reflected light.

11. The method according to claim 10, wherein, the method further comprises:

calculating an average value of grayscale values of several pixels in each column of the photosensitive sub-area, wherein a calculated result is a result in which pixel information of the M rows is compressed into pixel information of several rows.

12. The device according to claim 1, wherein, the photosensitive area is divided into multiple photosensitive sub-areas comprises:

the photosensitive area is divided into multiple strip-shaped photosensitive sub-areas, wherein the photosensitive sub-areas have M rows; and the array image sensor is further configured to:

obtain column position information of the multiple light spots of the reflected light after the multiple light spots of the reflected light is collected by the multiple photosensitive sub-areas.

13. The device according to claim 12, wherein, the multiple photosensitive sub-areas are configured to collect the multiple light spots of the reflected light comprises:

when the light emitter emits multiple beams of spot-shaped light, multiple photosensitive sub-areas are configured to collect multiple light spots of the reflected light, wherein the multiple light spots of the reflected light are distributed in a cross-like shape or a matrix-like shape in the multiple photosensitive sub-areas.

14. The device according to claim 12, wherein, the array image sensor is configured to obtain column position information of the multiple light spots of the reflected light comprises:

the array image sensor obtains column coordinate information of a barycenter position of the multiple light spots of the reflected light.

15. The device according to claim 14, wherein, the array image sensor is further configured to:

calculate an average value of grayscale values of several pixels in each column of the photosensitive sub-area, wherein a calculated result is a result in which pixel information of the M rows is compressed into pixel information of several rows.

16. The array image sensor according to claim 5, wherein, the photosensitive area is divided into multiple photosensitive sub-areas comprises:

the photosensitive area is divided into multiple strip-shaped photosensitive sub-areas, wherein the photosensitive sub-areas have M rows; and wherein the multiple photosensitive sub-areas are configured to obtain the position information of the multiple light spots of the reflected light by:

obtaining column position information of the multiple light spots of the reflected light after the multiple light spots of the reflected light are collected by the multiple photosensitive sub-areas.

17. The array image sensor according to claim 16, wherein, the multiple photosensitive sub-areas are configured to collect the multiple light spots of the reflected light by:

collecting multiple light spots of the reflected light, wherein the multiple light spots of the reflected light are distributed in a cross-like shape or a matrix-like shape in the multiple photosensitive sub-areas.

18. The array image sensor according to claim 16, wherein, the array image sensor is further configured to:

calculate an average value of grayscale values of several pixels in each column of the photosensitive sub-area, wherein a calculated result is a result in which pixel information of the M rows is compressed into pixel information of several rows.

19. The array image sensor according to claim 18, wherein, one or more of the multiple photosensitive sub-areas are set, by the array image sensor, as valid photosensitive areas which generate and output a response signal after collecting the light spots of the reflected light;

while the remaining photosensitive sub-areas are set as invalid photosensitive areas which skip outputting a response signal after collecting the light spots of the reflected light.

* * * * *